(12) United States Patent
Pereira et al.

(10) Patent No.: US 9,541,671 B2
(45) Date of Patent: Jan. 10, 2017

(54) METHOD AND SYSTEM FOR EVALUATION OF GAMMA-GAMMA WELL LOGGING DATA IN MINERAL EXPLORATION

(71) Applicant: VALE S.A., Rio de Janeiro (BR)

(72) Inventors: Wanderson Roberto Pereira, Belo Horizonte (BR); Dionisio Uendro Carlos, Belo Horizonte (BR); Marco Antônio da Silva Braga, Belo Horizonte (BR); Henry Francisco Galbiatti, Belo Horizonte (BR)

(73) Assignee: Vale S.A., Rio de Janeiro (BR)

( * ) Notice: Subject to any disclaimer, the term of this patent is extended or adjusted under 35 U.S.C. 154(b) by 0 days.

(21) Appl. No.: 14/701,210

(22) Filed: Apr. 30, 2015

(65) Prior Publication Data

US 2015/0316681 A1 Nov. 5, 2015

Related U.S. Application Data

(60) Provisional application No. 61/988,783, filed on May 5, 2014.

(51) Int. Cl.
*G01V 13/00* (2006.01)
*G01V 5/12* (2006.01)
(52) U.S. Cl.
CPC .............. *G01V 5/12* (2013.01); *G01V 5/125* (2013.01); *G01V 13/00* (2013.01)

(58) Field of Classification Search
CPC .............................. G01V 5/125; G01V 13/00
See application file for complete search history.

(56) References Cited

U.S. PATENT DOCUMENTS

| | | | | |
|---|---|---|---|---|
| 3,701,902 A | * | 10/1972 | Janssen et al. | 250/265 |
| 4,587,623 A | * | 5/1986 | Regimand | G01V 5/02 250/252.1 |
| 4,698,501 A | * | 10/1987 | Paske | 250/265 |
| 4,864,129 A | * | 9/1989 | Paske | G01V 5/125 250/252.1 |
| 2004/0104821 A1 | * | 6/2004 | Clark | 340/854.6 |

\* cited by examiner

*Primary Examiner* — Marcus Taningco
(74) *Attorney, Agent, or Firm* — Arent Fox LLP

(57) ABSTRACT

A calibration site for a gamma-gamma well logging tool for use in mineral exploration, the calibration site having a column consisting of a plurality of blocks of known densities; and a borehole through the column configured to accept the gamma-gamma well logging tool. Further, a method for calibrating a gamma-gamma well logging tool at the calibration site, the method including lowering the gamma-gamma well logging tool into a column consisting of a plurality of blocks of different known densities and having a borehole therein to receive the gamma-gamma well logging tool; raising the gamma-gamma well logging tool at a set rate; capturing a radiation count at a sensor of the gamma-gamma well logging tool; converting the radiation count to a recorded density for a particular depth at a computing device; and comparing the recorded density at each position of the column with the known densities.

21 Claims, 11 Drawing Sheets

METHOD AND SYSTEM FOR EVALUATION OF GAMMA-GAMMA WELL LOGGING DATA IN MINERAL EXPLORATION

CROSS-REFERENCE TO RELATED APPLICATIONS

This application is based upon and claims the benefit of priority to U.S. Provisional Application No. 61/988,783, filed May 5, 2014. The disclosure of the prior application of which is hereby incorporated in its entirety by reference.

FIELD OF THE DISCLOSURE

The present disclosure relates to tools for mineral exploration and in particular relates to the use of a gamma-gamma tool and a calibration site therefor.

BACKGROUND OF THE INVENTION

Geological drilling constitutes an important component in the exploration of minerals such as iron ore. This drilling provides information on lithologies that compose the geological model used in the estimation of resources and reserves. Geological drilling further allows for the analysis of boreholes, in order to determine percentages of ore in later stages of exploration and exploitation.

However, drilling holes are subject to operational factors that can lead to inaccurate conclusions. Such factors include blistering, recovering and contamination of samples, which interfere with the analysis of in situ densities.

Further, various techniques for borehole analysis may be inaccurate. Such techniques for density measurement and lithological contact determination may lead to inaccurate information due to the impossibility of preserving the core interstitial spaces in the drilling holes or the displacement of material during rods withdrawal. In order to minimize possibility of mistakes regarding drilling holes, additional techniques may be used to provide information on the rocks and their natural state, before removal by core drilling.

One way to provide information on lithological contacts or in situ density utilizes gamma-gamma well logging. Gamma-gamma well logging includes the exposure of a borehole wall to the influence of a radioactive source and then counting gamma radiation that is received by a receiver placed a known distance from the source. However, such tools are typically used for oil exploration and not mineral exploration. Due to the different lithologies involved between the two applications, use of the tool needs to be adapted for mineral exploration.

BRIEF DESCRIPTION OF THE DRAWINGS

The present disclosure will be better understood with reference to the drawings, in which:

FIG. 9 is a plot showing a zone of influence between two blocks and the effect of the zone on a probe travelling there through;

DETAILED DESCRIPTION OF THE DRAWINGS

The present disclosure provides a calibration site for a gamma-gamma well logging tool for use in mineral exploration, the calibration site comprising: a column consisting of a plurality of blocks of known densities; and a borehole through the column configured to accept the gamma-gamma well logging tool.

The present disclosure further provides a method for calibrating a gamma-gamma well logging tool at a calibration site comprising: lowering the gamma-gamma well logging tool into a column consisting of a plurality of blocks of different known densities and having a borehole therein to receive the gamma-gamma well logging tool; raising the gamma-gamma well logging tool at a set rate; capturing a radiation count at a sensor of the gamma-gamma well logging tool; and converting the radiation count to a recorded density for a particular depth at a computing device; and comparing the recorded density at each position of the column with the known densities.

Gamma-gamma well logging includes the exposure of a borehole wall to the influence of a radioactive source and the counting of the gamma radiation that is received at a receiver placed a known distance from the source towards the stone.

Figure 1:
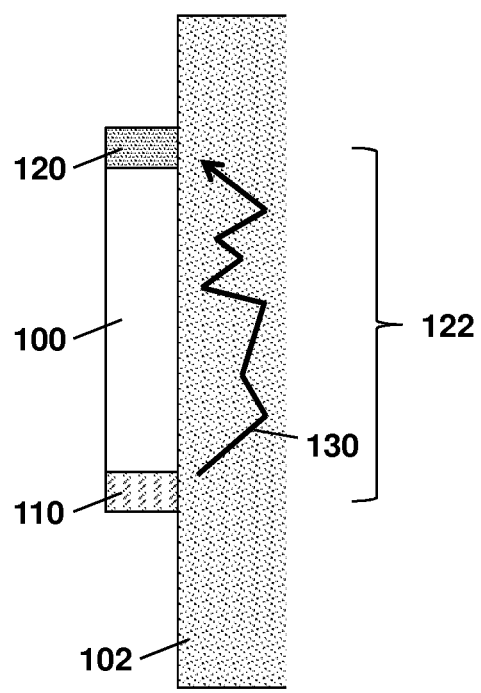
FIG. 1 is a schematic view of a simplified tool for gamma-gamma well logging.

Reference is now made to FIG. 1. In the example of FIG. 1, a well logging tool 100 is placed in proximity to a material to be studied 102. For example, the material 102 may be a rock formation inside a borehole.

Tool 100 includes a gamma source 110 and at least one gamma radiation sensor 120, which are a known distance apart, shown by reference 122.

Gamma source 110 provides a gamma ray beam which proceeds into material 102. Some of the gamma ray beams will deflect and be detected by sensor 120, as shown by beam 130.

In particular, due to the interaction between gamma particles and the geological material 102, the counting observed by the sensor 120 is attenuated with respect to the counting observed directly from the radioactive source, and the counting is then associated with the density of the geological material in accordance with equation 1 below.

$$N = N_0 e^{-\mu \rho x} \qquad (1)$$

In equation 1 above, N is the counting detected on the sensor, $N_0$ is the direct counting emitted from the source, $\mu$ is the mass absorption coefficient, $\rho$ is the material density, and x is the source-sensor distance. Thus from equation 1, as $\mu$, x and $N_0$ are known, the density can be calculated based on the count N received at the sensor.

Knowing the parameters involved in equation 1, it is therefore possible to relate the density values in the material 102 with the values of gamma particle counting at sensor 120.

Well Logging Operations

In operation, gamma-gamma well logging includes introducing a well logging probe into a borehole. The tool is equipped with a radioactive source and, in practice, at least two receiver sensors for reading the counting per second (CPS) of incident gamma particles. The two sensors have different but known spacing from the source. The two sensors are used for the determination of rock contacts influenced by proximity of such contacts to each sensor.

Figure 2:
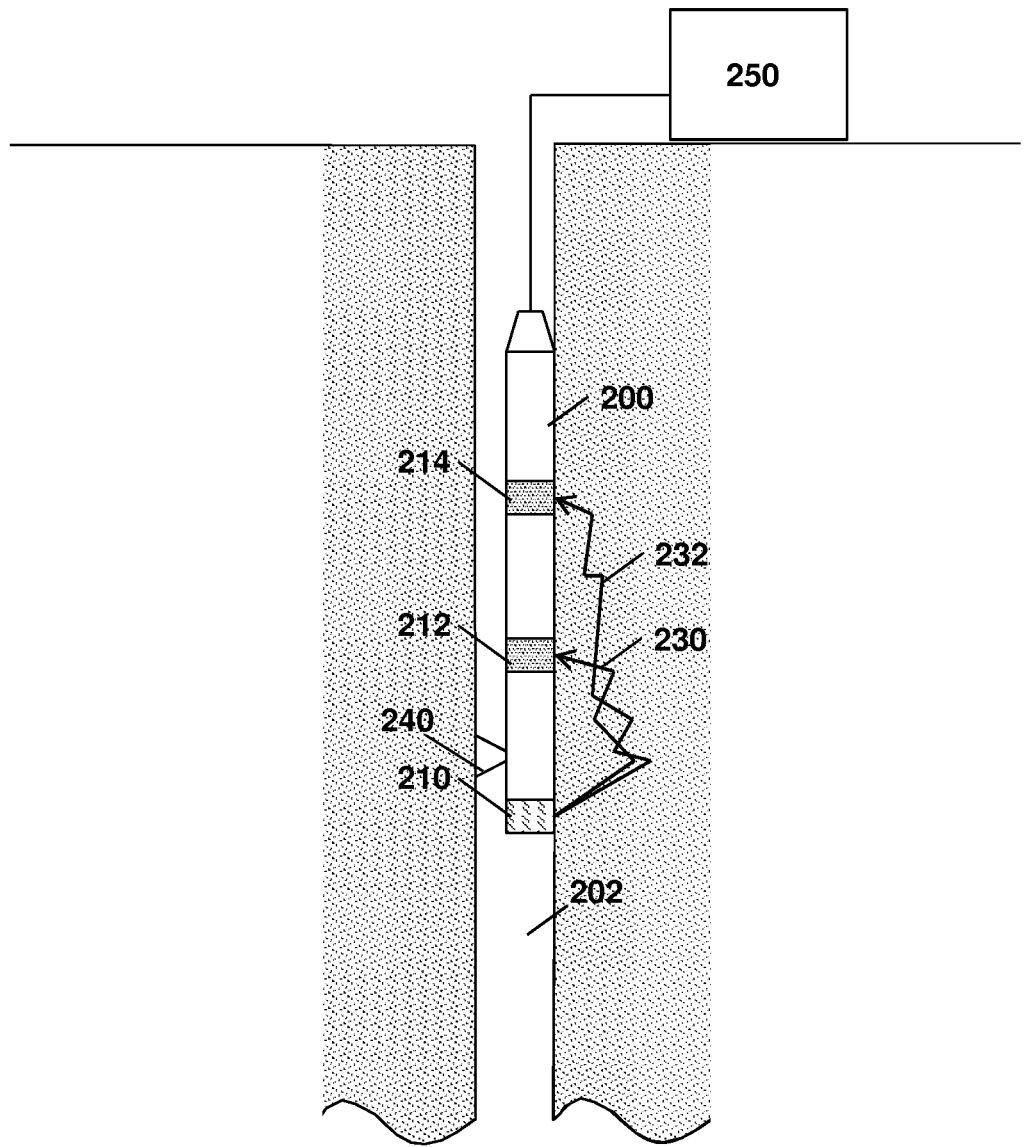
FIG. 2 is a schematic view of a further simplified tool for gamma-gamma well logging.

In particular, reference is now made to FIG. 2, which shows an example of a probe 200 that may be lowered into a borehole 202. Probe 200 includes a gamma radiation source 210 which has known properties. For example, in one embodiment the source may be cesium-137.

Probe 200, in the example of FIG. 2, includes two sensors, namely short sensor 212 and long sensor 214. The spacing between source 210 and short sensor 212 and long sensor 214 is predetermined and known. However, in other embodiments more than two sensors may be used on a probe 200. Sensors 212 and 214 may be any suitable sensor which can detect the gamma ray beams from source 210 and provide an accurate count.

Source 210 emits gamma ray beams as shown by, for example, gamma ray beams 230 and 232. The various gamma ray beams may be detected, after scattering within the material surrounding borehole 202, by either short sensor 212 or long sensor 214.

In some embodiments, probe 200 may include a caliper 240 to determine the diameter of the hole. As will be appreciated by those in the art, the hole diameter may vary based on factors such as friable material becoming loose or due to compression reducing the diameter of the hole. Such caliper 240 may further force probe 200 into contact with a wall of borehole 202.

In one embodiment, data from probe 200 is provided to the surface to a data receiver 250 utilizing a communications cable 252. However, other options are possible, including the storing of data on the probe 200 during operation and transferring such data to a computer for processing at a later time. Further, in some embodiments probe 200 may include some processing or pre-processing capabilities to allow for quality control filtering or identification on the probe itself.

Data receiver 250 may be a computer with the capability of conditioning the data. In other embodiments, data receiver 250 may merely record the data for processing at a later time. In the second option, a further computer (not shown) may perform computation on the data provided by probe 200.

In operation, probe 200 may be lowered into a borehole and data readings may be captured as the tool is raised. The depth of the probe would be known generally based on the tool lowering mechanism, and may further be calibrated based on naturally occurring radiation. The rate of ascension of the probe may be set to assure quality readings of the material surrounding borehole 202.

Gamma-gamma well logging operates on a principle based on the property of particles interacting with materials exposed to a gamma ray beam. The density of the material affects the interaction of a particle beam. In particular, the more dense the material, the higher of interaction of particles and thus a lower count of gamma radiation received at a receiver.

Figure 3:
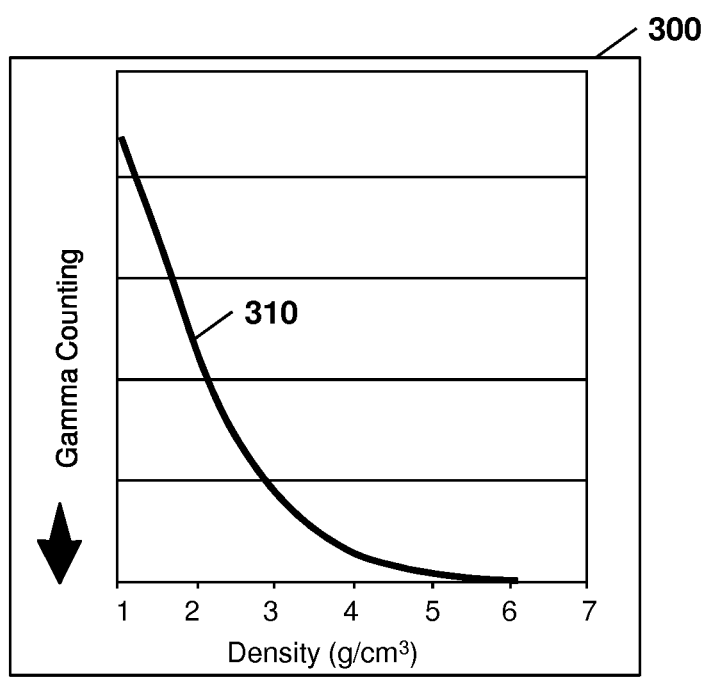
FIG. 3 is a plot showing gamma count readings versus density for a caesium-137 source.

Reference is now made to FIG. 3 which shows a plot 300 expressing the relationship between the density and the count. In particular, as seen in FIG. 3, line 310 provides an exponential decrease in the gamma count as the material gets denser.

Figure 4:
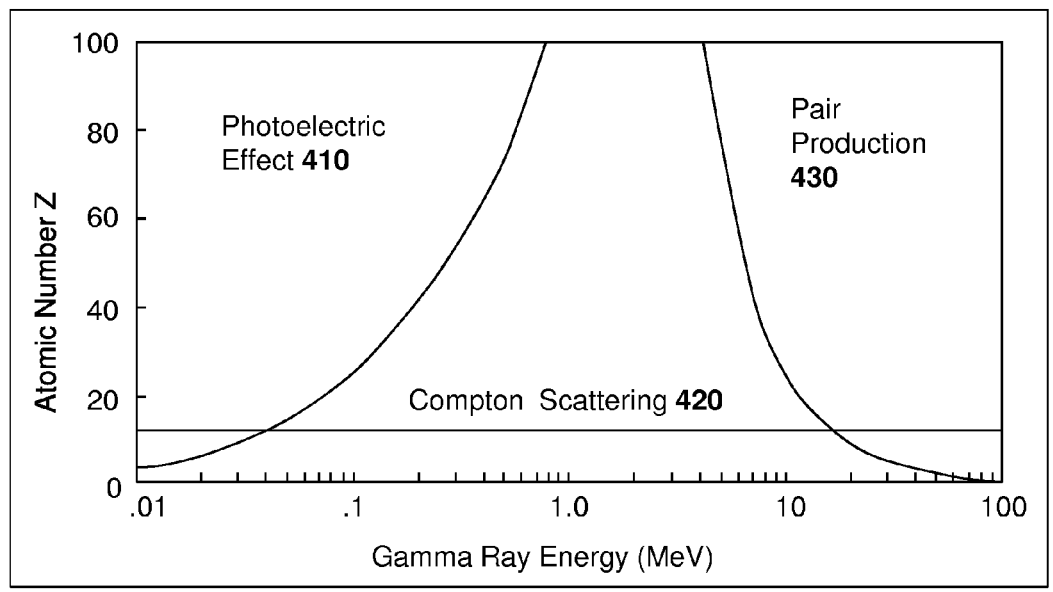
FIG. 4 is a plot showing the various ranges for radiation depending on gamma ray energy.

Referring to FIG. 4, there are three ways of interacting with matter for the radiation, depending on the energy associated with a particle beam. Such interaction includes photoelectric effect 410, Compton scattering 420, and pair production 430. As seen in FIG. 4, the energy of the gamma ray affects the type of energy. In well logging interactions, the interactions mainly happen in the Compton scattering range.

In mineral exploration, formations hosted in natural environments occur within a range of densities. Such range of densities can range from lower than 1.5 g/cm$^3$ to higher than 4.1 g/cm$^3$. Thus, a tool utilized to measure the density in a borehole should allow for the unambiguous determination of densities within such range.

In practice, various radiation sources may be used. Examples of acceptable sources include caesium-137 or cobalt 60. Each provides various advantages and disadvantages.

Figure 5:
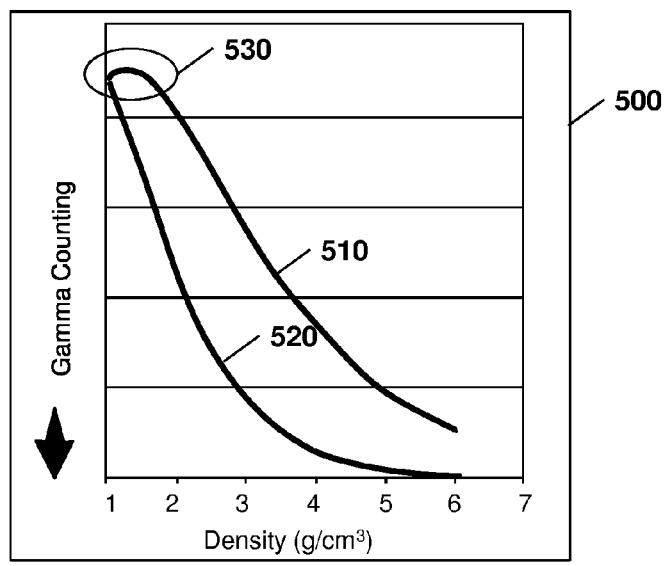
FIG. 5 is a plot showing gamma count readings versus density for a caesium-137 source and a cobalt-60 source.

In particular, reference is now made to FIG. 5 which shows a plot 500 of the gamma counting versus density for the use of cobalt 60 and caesium-137. In particular, line 510 shows the comparison of counting for density using cobalt 60 and line 520 shows the use of caesium-137.

From FIG. 5, line 510 shows that with a cobalt 60 source, higher densities may be determined with greater accuracies, since the variations of counting with density is higher than that of caesium-137 shown by line 520. However, in lower densities, in particular in the region shown by area 530, ambiguity is introduced. Specifically, as the curve increases and then decreases, between densities of 1 g/cm$^3$ and 2 g/cm$^3$, a gamma count may be plotted to 2 points on the curve, thereby introducing ambiguity.

By contrast, line 520 shows that caesium-137 covers all densities expected for the mineral exploration and associated lithologies unambiguously, thereby providing a single value for each count. In this regard, caesium-137 is a better radiation source material than cobalt 60.

Therefore, utilizing a gamma-gamma well logging tool with a caesium-137 source, it is possible to collect measurements at both edges of the density ranges expected for mineral exploration such as iron ore exploration, producing significant detail for the densities in the mineral exploration.

Figure 6:
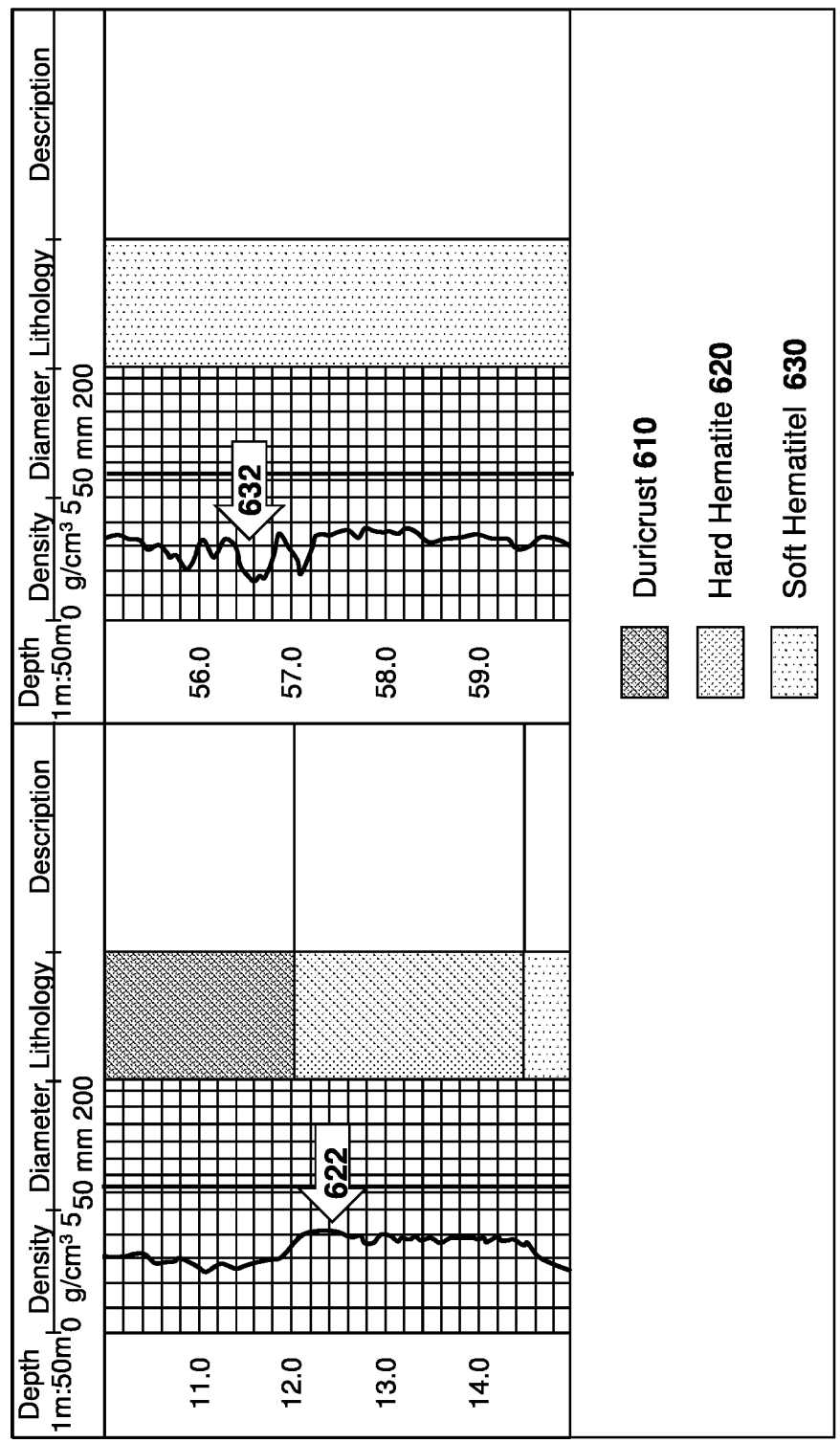
FIG. 6 is a plot showing density for a plurality of lithologies at different depths.

Use of such tool provides for a density plot, such as that shown with regard to FIG. 6. As seen in FIG. 6 the density varies based on the type of material. For example, in the exploration, a duricrust layer 610 produces densities in the range of 3.0 g/cm$^3$. A hard hematite layer 620 produces densities above 4.0 g/cm$^3$, as shown by arrow 622. A soft hematitel layer 630 may produce densities below 2.0 g/cm$^3$, shown by arrow 632 in the example of FIG. 6.

In order to ensure accuracy of the testing methodology, a tool may be calibrated by taking measurements in known density materials and comparatively analyzing the measured and expected values. Thus, in accordance with one embodiment of the present disclosure, a specially designed facility is provided for such calibration.

In particular, to assess gamma-gamma well logging, three parameters are required. These are depth, density and contacts.

Depth control is meant to detect and correct discrepancies in the depth recorded by the well logging tools. Although discrepancies are more visible at depths of the order of tens of meters, even with shorter distances the observation in a controlled environment allows the calibration of the tool to predict potential differences between actual location and the well logging record.

With regards to density, this parameter should be determined with precision in a range higher than the density variation found for a studied lithology. Such density measurements may be conditioned through the control of the composing material density at the calibration site. As discussed below, control may be made of the concrete that composes test blocks at the test site.

Further, the geometry of the contacts, as well as the type of transition between such contacts, may be known at a calibration site. Such configuration may be a consideration in the interpretation of test data. Specifically, in field boreholes, the geometry and type of contact may determine the behavior of the density curve in the transition between lithologies. Such geometry may include a blunt or gradual type of contact. A calibrated tool may be used for the interpretation and control of contacts.

The assessment of gamma-gamma well logging, and in particular calibration of depth, density and contacts for a tool or probe, and verification of the viability of the tool or probe, may be done at a calibration site. In order to make such a calibration site, a composition of test blocks may be created at the test facility to calibrate the tool.

Figure 7:
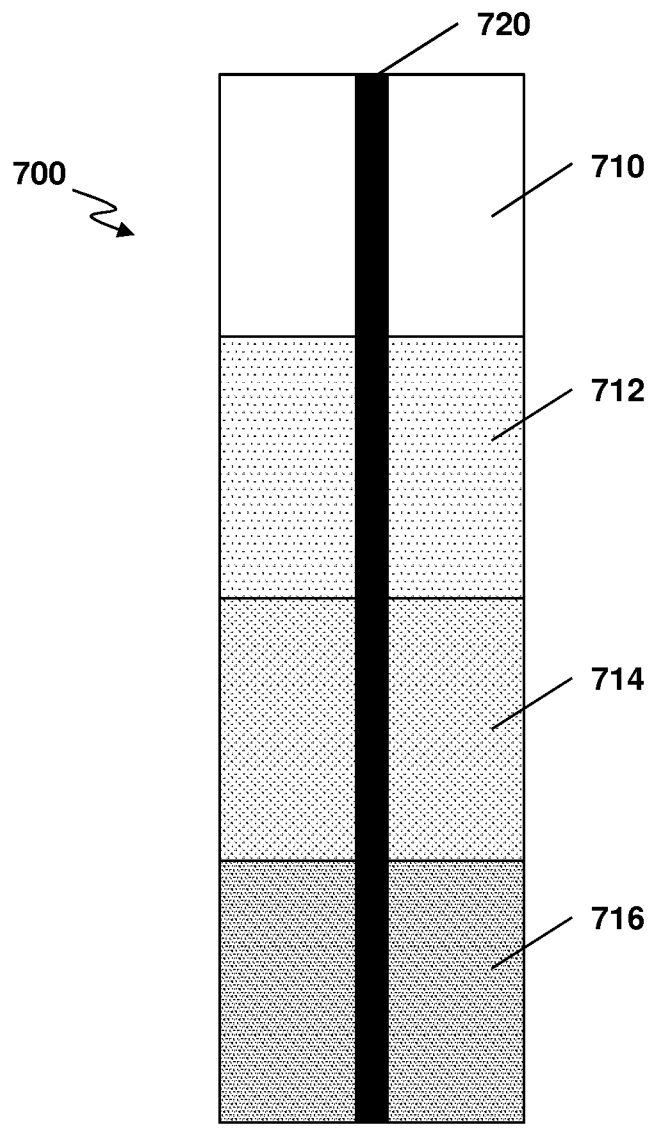
FIG. 7 is a simplified schematic diagram of a column comprising a plurality of different density blocks.

In particular, reference is now made to FIG. 7, which shows a test column 700 comprised of various concrete blocks having different, known densities. The test blocks are vertically overlapped and crossed by a hole with the same specifications of a field borehole. In the example of FIG. 7, four blocks are proposed each simulating different lithologies with different densities. However, the use of four blocks in a configuration site is merely an example, and more or less blocks could be used at a test site.

In the embodiment of FIG. 7, block 710 may, for example, simulate a rock with a density of 1.5 g/cm$^3$. Block 712 may simulate a rock with a density of 2.5 g/cm$^3$. Block 714 may simulate a rock with a density of 3.5 g/cm$^3$. Block 716 may simulate a rock with a density of 4.5 g/cm$^3$.

Borehole 720 is aligned between the four blocks and simulates the diameter of a borehole in the field. In some cases a lining or casing may be provided within borehole 720 for simulation of field conditions.

The blocks are stacked having a defined transition between the blocks. In one embodiment the blocks may be stacked within a tower for testing purposes. In other embodiments, the blocks may be stacked within a hole and in-ground testing of the blocks may be performed.

The constructions methodology for each of blocks 710 to 716 focuses on technological control of concrete blends that compose each block in order to ensure the density of each block regarding its density value and for block homogeneity.

In particular, in one simulation of the test column 700, each block was built by using a cylindrical form filled with a concrete blend of the density required for that particular block. The blocks were then codified according to the composing blend density, covering the density range seen in mineral exploration such as iron ore exploration.

Table 1 provides for the block composition utilized in one example of a test column 700.

TABLE 1

Density and Composition of Blocks at Test Site

| Block | Nominal density (g/cm$^3$) | Block composition |
|---|---|---|
| 1 | 1.5 | Cement, grit, Styrofoam, water, additives |
| 2 | 2.5 | Cement, grit, grave, water, Styrofoam, iron ore, additives |
| 3 | 3.5 | Cement, grit, grave, water, Styrofoam, iron ore, additives |
| 4 | 4.5 | Cement, grit, grave, water, Styrofoam, iron ore, additives |

As seen by FIG. 7, the blocks may be stacked, in one embodiment, with increasing densities.

For the calibration site itself, due to the use of radioactive sources, the calibration site may include various features for safety. These include a bunker for safe storage of the radioactive source. Such bunker may be built close to the tower or test hole having the test column 700 to avoid exposure to the radioactive source. Such bunker may be protected by housing in a protective grid.

The calibration site may further allow for moving equipment, such as hoist carriers, typically used for test and verification of physical well logging through a pulley system installed for this purpose.

All of these provisions within the test facility allow for tests to be conducted in an expeditious manner, performing measuring through a reasonable short time span with equipment that is used on site at geophysical well logging campaigns.

A tool might be calibrated in accordance with the known density data for verifying proper operation. Thus, for the set of blocks in test column 700 a succession of ascending density values from the top to the bottom is expected in the well logging. Further, since the tops and bottoms of each block are horizontal planes, the contacts recorded by curves are expected to be smooth, showing a transition for the nominal density of each block.

Figure 8:
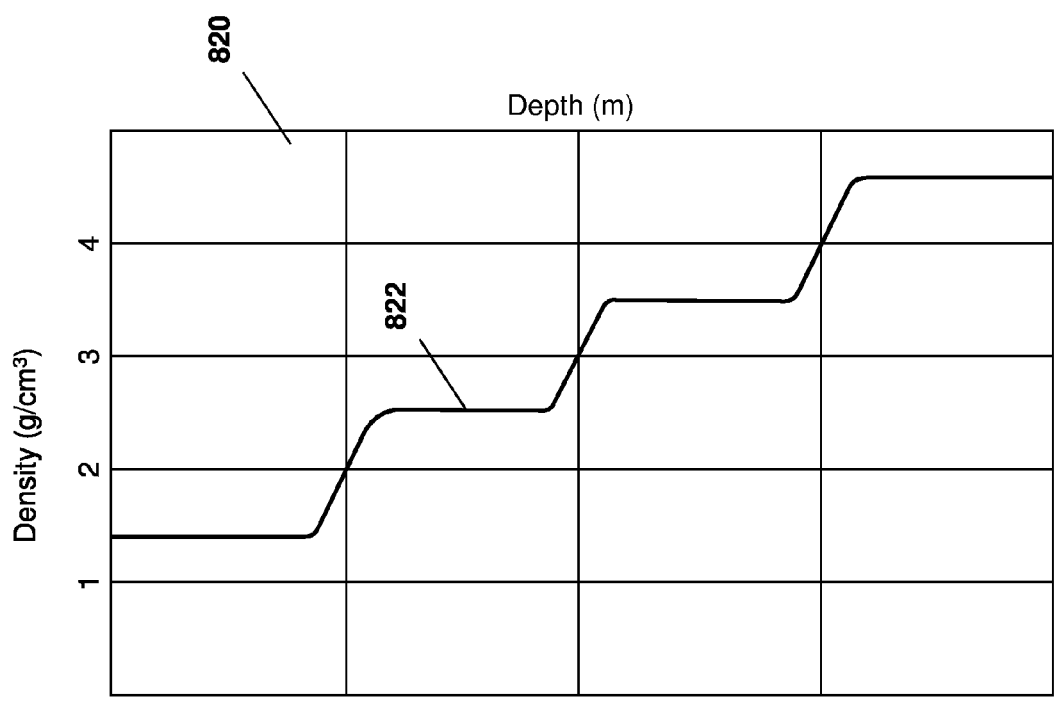
FIG. 8 is a graph showing the density measurement for a probe within the column of FIG. 7.
Figure 8:
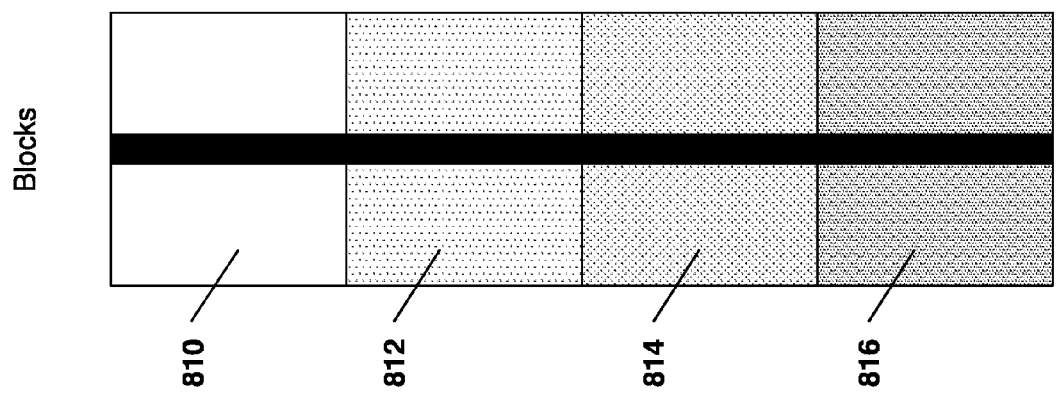

Reference is now made to FIG. 8. As seen in FIG. 8, a test column 800 similar to that of test column 700 is provided with blocks 810, 812, 814 and 816, each having densities of 1.5, 2.5, 3.5 and 4.5 g/cm$^3$ respectively.

A plot 820 of the densities read for the tool shows a density line 822. In a typical test where the tool is lowered to the bottom of the hole and slowly raised, the density may start at 4.5 g/cm$^3$ and include a smooth transition when the tool crosses the interface between blocks 816 and 814 to a density of 3.5 g/cm$^3$. Similarly, transitions occur at each of the block boundaries.

The smooth transition between the blocks is due to the influences of each block for which the gamma-gamma well logging device is sensitive. Thus, when the sensor is placed amid block 810 depth range in the influence zone of block 812, it will record a density averaging 1.5 g/cm$^3$ and 2.5 g/cm$^3$ tending to the density of block 810.

Figure 9:
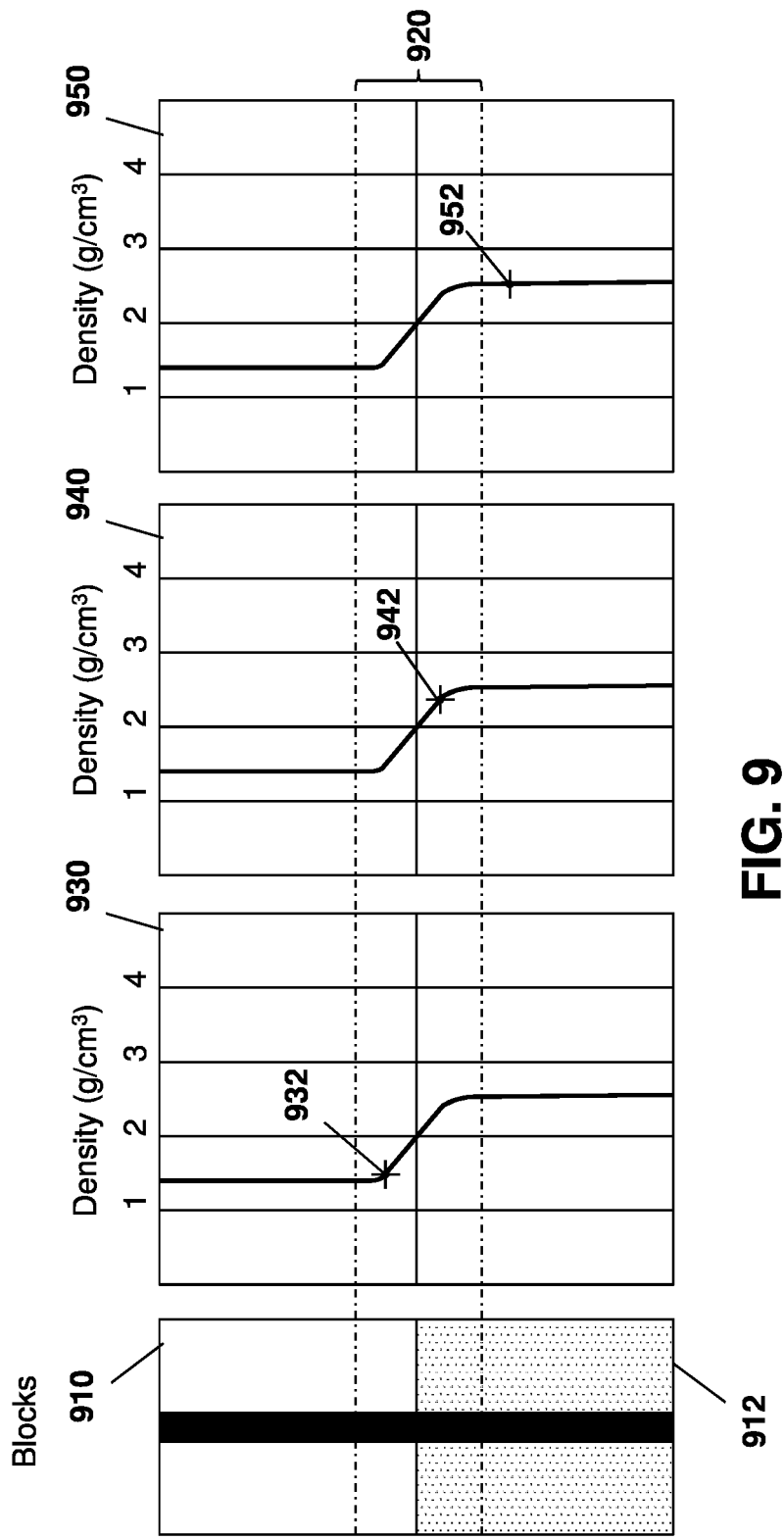

This is, for example, seen in FIG. 9 where blocks 910 has a lower density and block 912 has a higher density. As the tool is within the block influence zone 920 the other block will influence the tool.

As seen by plot 930, the receiver is at a position 932 and therefore the density read by a tool has started to increase.

In plot 940, the receiver is at position 942 and has significant influence from block 912.

In plot 950 the receiver is now below influence zone 920 at position 952, and therefore is only recording the density of block 912.

Figure 10:
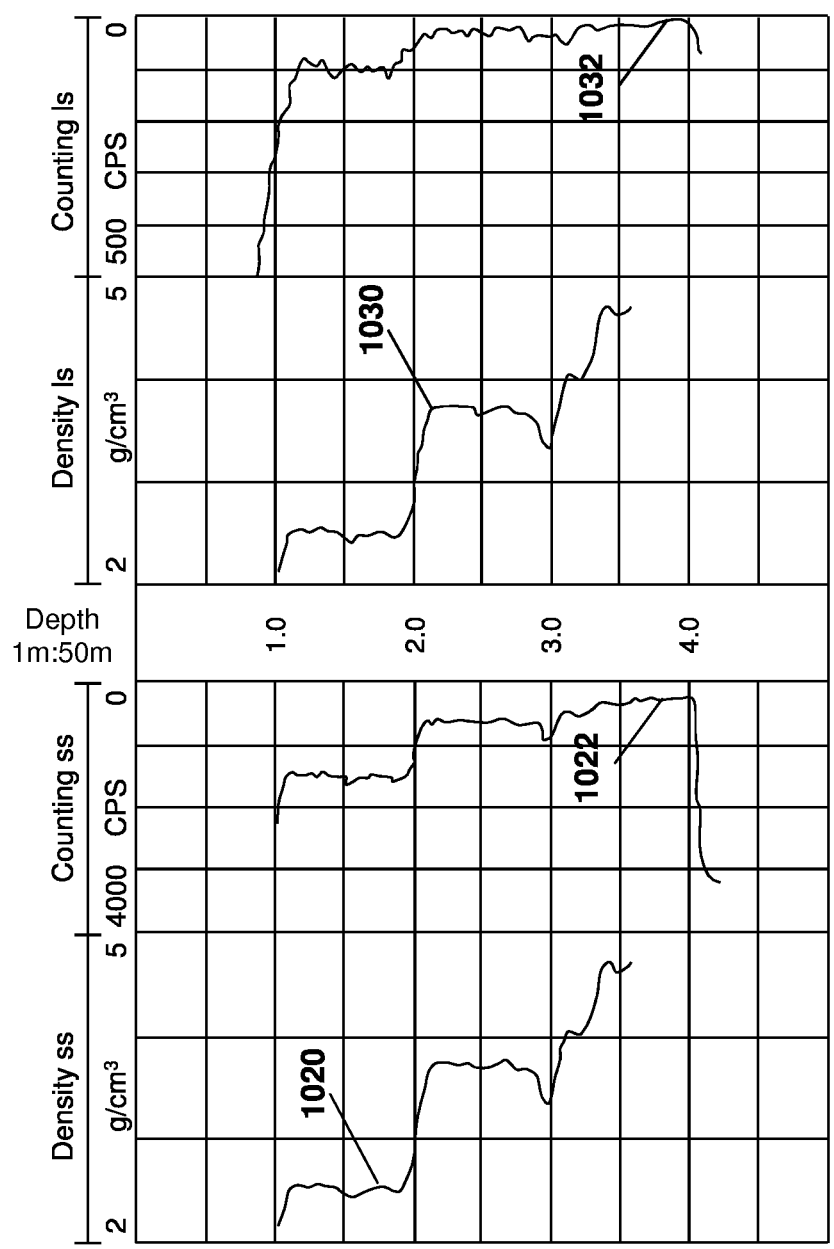
FIG. 10 is an example plot of actual density and counting readings utilizing a calibration site.

Real world logging is shown with regard to FIG. 10, which shows a two sensor tool having a short sensor (SS) and a long sensor (LS). In particular, as seen in FIG. 10, the density of the short sensor shown by line 1020 increases at the transition zones of two meters and three meters to the expected density of the blocks.

The raw data for the counting is also shown with regard to line 1022.

For the long sensor, similar results occur, as shown by line 1030 and the counting of such results is shown by line 1032.

Due to the geometry of the logging tool, there is a range with suppressed values related to the space between the source and sensors. The measurement in the embodiment of FIG. 10 was done only when both source and sensors were totally within the hole.

From FIG. 10, it may be seen that there is a continuity of counting values that extends to the test tower bottom through which the adjacent density values may be predicted based on the relation shown in equation 1 above.

Figure 11:
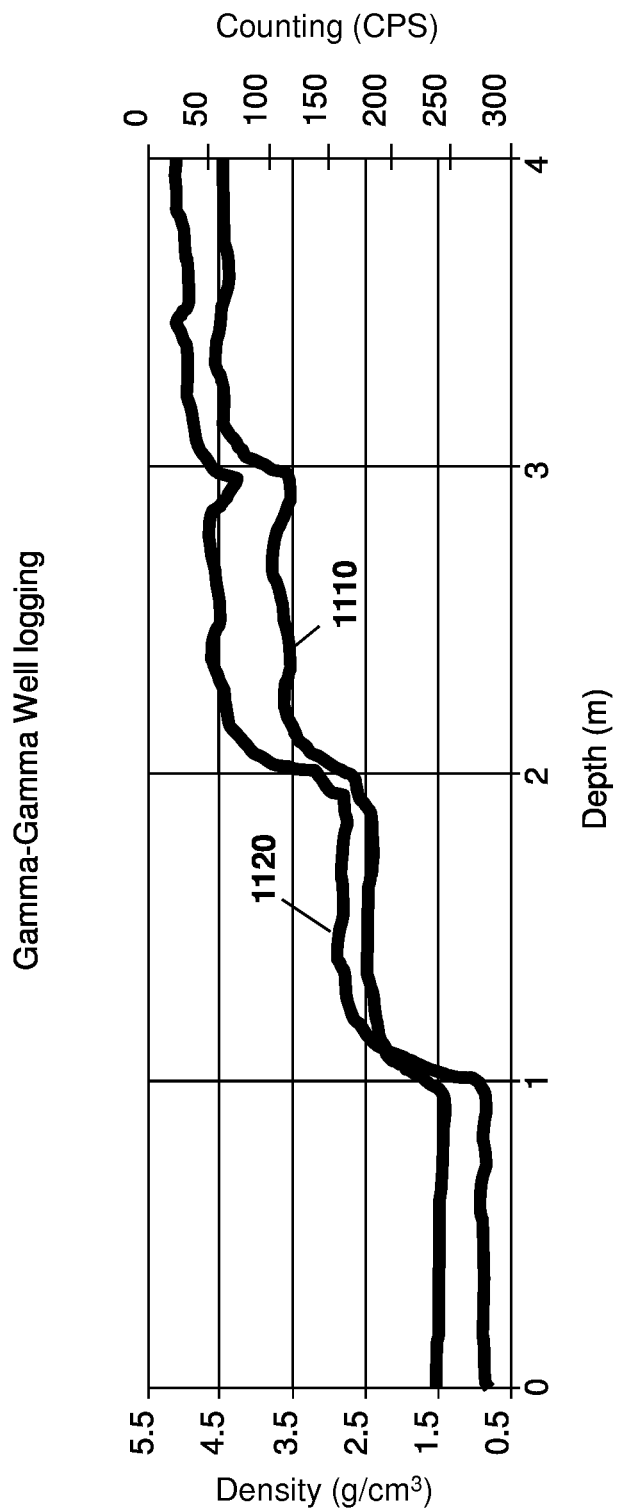
FIG. 11 is a plot showing the density versus counting at a plurality of depths.

Further, the relation between the density and the depth is shown with regard to FIG. 11. In particular, as seen in FIG. 11, a density curve 1110 closely follows a counting curve 1120.

Based on the above, the expected density range for lithologies found in mineral exploration such as iron ore exploration, may be simulated at a test site. Gamma well logging measurement data in this context consists primarily of borehole data whose control may be subject to geological conditions such as rock heterogeneity and compositional variation. The data control may further be subject to conditions of borehole walls, factors that may influence compositional variation, as well as conditions of borehole walls, factors that may influence the density measures with discrepancies in comparison to the nominal density of each lithology.

The use of a calibration site allows for the creation of calibration curves for densities available for gamma-gamma well logging present in mineral exploration lithologies. Specifically, gamma-gamma well logging is traditionally applied for oil exploration having a restricted density range for the sedimentary framework in large oil containment basins. The application of the tool to mineral exploration therefore may utilize the calibration of the tool in order to provide accurate data for in situ operation.

Furthermore, due to the multi-parameter test results, geophysical well logging historically applied to oil exploration provides for the density variations according to other factors such as the effective porosity and filling of stone pores not only to the lithology itself. Consequently, such oil lithology factors provide for differences from iron exploration.

Density is a direct reference used in calibration for geophysical modelling by potential field methods. In particular, gravity gradiometry is a parameter for verification of density contrast distributions in the subsurface. However, the density ranges measured at the calibration site match density ranges found in iron ore explorations and thus the densities measured in situ correspond to lithologies described for each range. In this regard, a gamma-gamma density tool may be utilized in the exploration of mineral such as iron ore exploration.

Computation of the densities, storage of test result, and calibration of the tool may be performed on any computing device. One example of a simplified computing device is provided with regards to FIG. 12.

Figure 12:
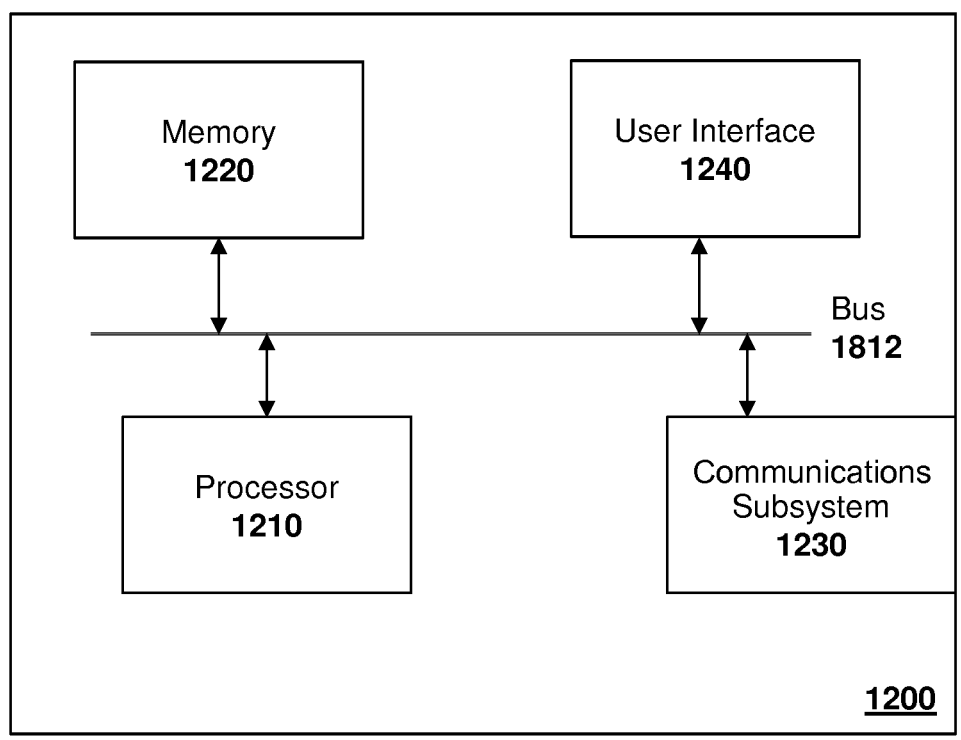
FIG. 12 is a simplified block diagram of an example computing device capable of being used with the system of the present disclosure.

FIG. 12 is a block diagram of a computing device 1200 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The computing device 1200 may comprise a processor 1210 that interacts with a user interface 1240 having one or more input/output devices, such as a speaker, microphone, mouse, touchscreen, keypad, keyboard, printer, display, and the like.

The computing device may include one or more processors 1210, memory 1220, and communications subsystem 1230 connected to a bus 1212.

The bus 1212 may be one or more of any type of several bus architectures including a memory bus or memory controller, a peripheral bus, video bus, or the like. The processor 1210 may comprise any type of electronic data processor. The memory 1220 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The memory 1220 may further comprise any type of storage device configured to store data, programs, and other information and to make the data, programs, and other information accessible via the bus. Memory 1220 may comprise, for example, one or more of a solid state drive, hard disk drive, a magnetic disk drive, an optical disk drive, or the like.

The user interface 1240 may be used to couple external input and output devices to the processing unit. Examples of input and output devices include a display coupled to a video adapter, a mouse/keyboard/printer coupled to an I/O interface. Other devices may be coupled to the processing unit, and additional or fewer interface cards may be utilized. For example, a serial interface such as Universal Serial Bus (USB) (not shown) may be used to provide an interface for a printer, and an input may be provided for probe 200 data.

The computing device 1200 may also a communications subsystem 1230, which may comprise wired links, such as an Ethernet cable or the like, and/or wireless links to access nodes or different networks. Such communications subsystem 1230 would allow the computing device to communicate with remote units via the networks. For example, the communications subsystem 1230 may provide wireless communication via one or more transmitters/transmit antennas and one or more receivers/receive antennas. In an embodiment, the computing device 1200 is coupled to a local-area network or a wide-area network for data processing and communications with remote devices, such as other processing units, the Internet, remote storage facilities, or the like.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A calibration site for a gamma-gamma well logging tool for use in mineral exploration, the calibration site comprising:
    a column including a plurality of blocks of known densities; and
    a borehole through the column configured to accept the gamma-gamma well logging tool.

2. The calibration site of claim 1 wherein each of the plurality of blocks has a different, known density, and wherein the plurality of blocks is stacked so a lowest density block is on top and a highest density block is on the bottom of the stack.

3. The calibration site of claim 2, wherein the densities of plurality of blocks is selected to span a range of densities of lithologies encountered in mineral exploration.

4. The calibration site of claim 3, wherein the densities of each block in the plurality of block range from 1.5 g/cm3 to 4.5 g/cm3.

5. The calibration site of claim 2, wherein each block in the plurality of blocks is homogenous for a density.

6. The calibration site of claim 5, wherein each block of the plurality of blocks is comprised of at least one of cement, grit, gravel, water, Styrofoam, and iron ore.

7. The calibration site of claim 2, wherein a horizontal plane is formed between each of the blocks in the column.

8. The calibration site of claim 1, wherein the borehole includes a casing.

9. The calibration site of claim 1, further comprising a bunker for storage of a radioactive source for the gamma-gamma well logging tool.

10. The calibration site of claim 1, further comprising a pulley system for the gamma-gamma well logging tool.

11. A method for calibrating a gamma-gamma well logging tool at a calibration site comprising:
    lowering the gamma-gamma well logging tool into a column including a plurality of blocks of different known densities and having a borehole therein to receive the gamma-gamma well logging tool;
    raising the gamma-gamma well logging tool at a set rate;
    capturing a radiation count at a sensor of the gamma-gamma well logging tool;
    converting the radiation count to a recorded density for a particular depth at a computing device; and
    comparing the recorded density at each position of the column with the known densities.

12. The method of claim 11, wherein the plurality of blocks is stacked so a lowest density block is on top and a highest density block is on the bottom of the stack.

13. The method of claim 12, wherein the densities of plurality of blocks spans a range of densities of lithologies encountered in mineral exploration.

14. The method of claim 12, wherein the densities of each block in the plurality of block range from 1.5 g/cm3 to 4.5 g/cm3.

15. The method of claim 11, wherein each block in the plurality of blocks is homogenous for a density.

16. The method of claim 11, wherein a horizontal plane is formed between each of the blocks in the column.

17. The method of claim 16, further comprising comparing a density curve within a transition influence zone between two blocks with a theoretic density curve.

18. The method of claim 11, wherein results from the calibration are used as reference curves in geophysical well logging operations.

19. The calibration site of claim 1, further comprising a gamma-gamma well logging tool that comprises a radiation source, a short sensor and a long sensor, wherein the short sensor and long sensor have different but known spacing from the source.

20. The method of claim 11, wherein the gamma-gamma well logging tool comprises a radiation source, a short sensor and a long sensor, wherein the short sensor and long sensor have different but known spacing from the source.

21. A system comprising:
    a column including a plurality of blocks of known densities;
    a gamma-gamma well logging tool comprising a radiation source, a short sensor and a long sensor, wherein the short sensor and long sensor have different but known spacing from the source; and
    a borehole through the column configured to accept the gamma-gamma well logging tool.

* * * * *